United States Patent
Ralls et al.

(10) Patent No.: US 6,406,587 B1
(45) Date of Patent: Jun. 18, 2002

(54) METHOD AND AN APPARATUS FOR FUSING A SIDEWALL FITTING ONTO A PLASTIC PIPE

(75) Inventors: Gene R. Ralls, Tulsa; Rick D. Pruett, Kellyville, both of OK (US)

(73) Assignee: Connectra Fusion Technologies, LLC, Gainesville, TX (US)

( * ) Notice: Subject to any disclaimer, the term of this patent is extended or adjusted under 35 U.S.C. 154(b) by 62 days.

(21) Appl. No.: 09/656,818

(22) Filed: Sep. 7, 2000

Related U.S. Application Data

(60) Provisional application No. 60/156,876, filed on Sep. 30, 1999.

(51) Int. Cl.[7] .............................................. B32B 31/00
(52) U.S. Cl. .................... 156/293; 156/296; 156/499; 156/538
(58) Field of Search ................................ 156/293, 296, 156/499, 538, 556, 580, 583.1

(56) References Cited

U.S. PATENT DOCUMENTS

| | | | |
|---|---|---|---|
| 3,616,024 A | 10/1971 | Windle | 156/257 |
| 3,743,566 A | 7/1973 | Louthan et al. | 156/499 |
| 3,820,773 A | 6/1974 | Aizawa | 269/32 |
| 3,966,528 A | 6/1976 | Christie | 156/293 |
| 4,092,205 A | 5/1978 | Mieszczak | 156/499 |
| 4,338,712 A | 7/1982 | Dearman | 29/281.6 |
| 4,445,677 A | 5/1984 | Hansen et al. | 269/41 |
| 4,533,424 A | 8/1985 | McElroy | 156/378 |
| 4,542,892 A | 9/1985 | Goldner | 269/41 |
| 4,556,207 A | 12/1985 | Thompson et al. | 269/41 |
| 4,894,521 A | 1/1990 | Evans | 219/535 |
| 4,957,570 A | 9/1990 | Jenkins et al. | 156/64 |
| 5,163,713 A | * 11/1992 | Brettell et al. | 285/21 |
| 5,398,974 A | * 3/1995 | Mizukawa et al. | 285/21 |
| 5,505,811 A | 4/1996 | Welch et al. | 156/358 |

\* cited by examiner

Primary Examiner—James Sells
(74) Attorney, Agent, or Firm—Gable & Gotwals

(57) ABSTRACT

An apparatus for fusing a plastic fitting on to a plastic pipe has first and second spaced parallel vertical support shafts each having a lower end removably attachable to the plastic pipe. A horizontal transverse housing is secured to an upper end of the support shafts and has a central opening therethrough that slidably receives a vertical main shaft. A brake supported by the transverse housing controls the vertical position of the main shaft. A transverse load cell has spaced apart openings slidably receiving the support shafts is affixed to a lower end of the main shaft. A hydraulically displaceable force shaft is telescopically received in an opening in the load cell and has a fitting holder at a lower end thereof. A hydraulic force generator in the load cell operated by a hand wheel displaces the force shaft to force a fitting held by the fitting holder against the plastic pipe.

9 Claims, 1 Drawing Sheet

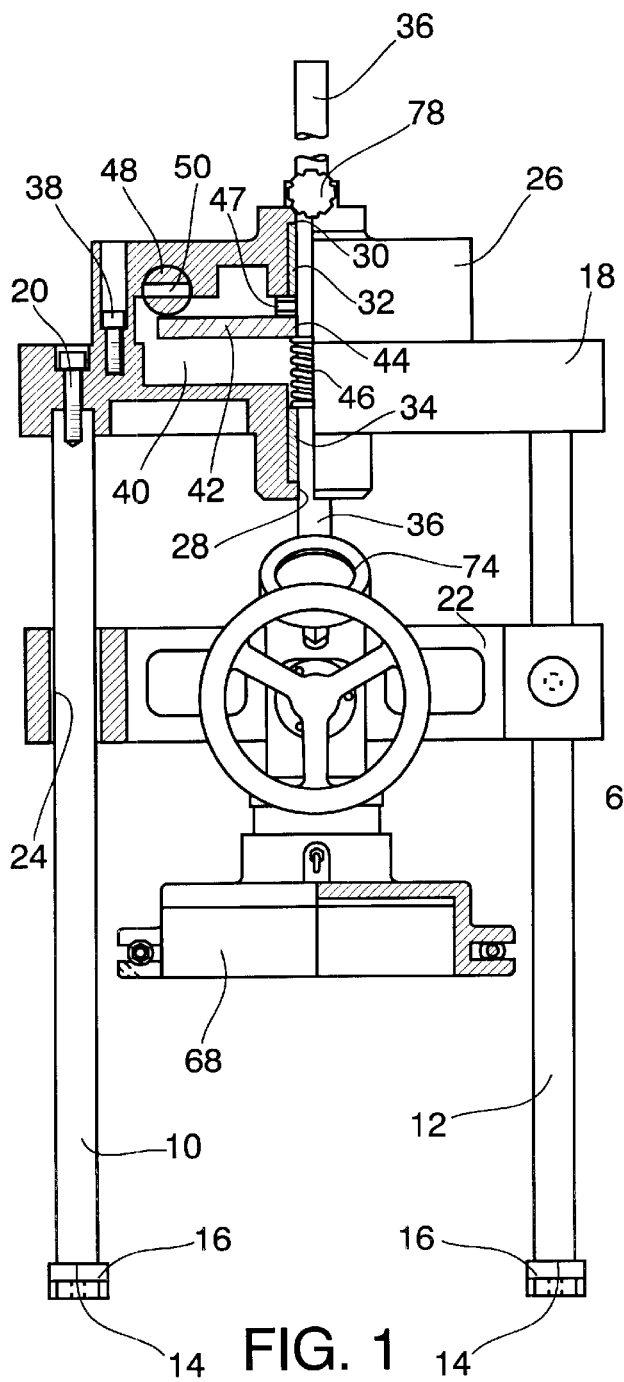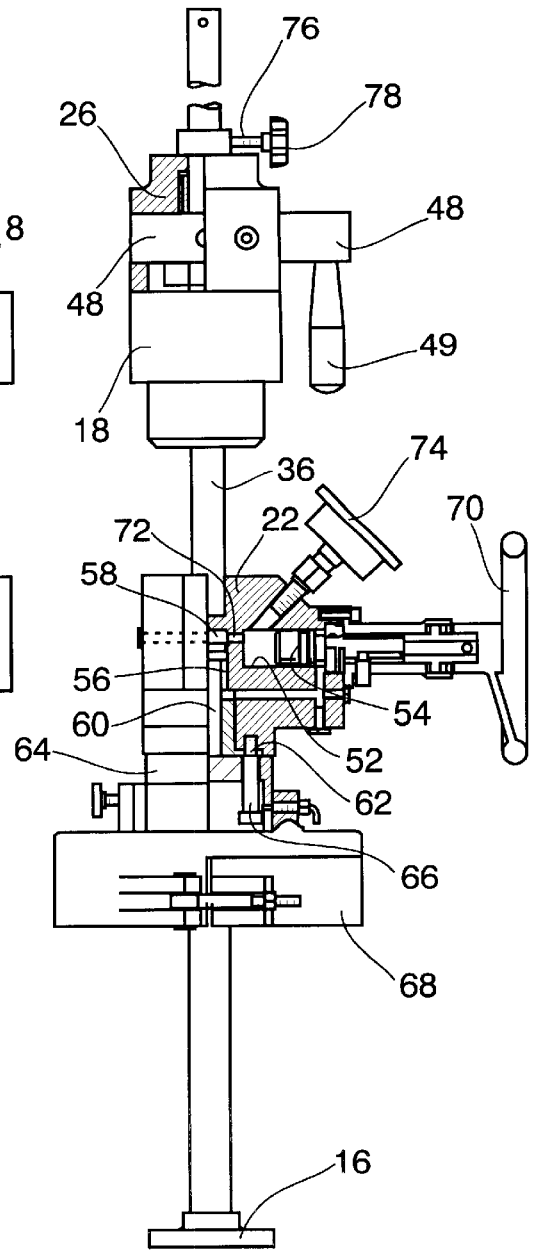

METHOD AND AN APPARATUS FOR FUSING A SIDEWALL FITTING ONTO A PLASTIC PIPE

REFERENCE TO PENDING APPLICATIONS

This application is related to United States Provisional Patent Application Ser. No. 60/156,876 filed Sep. 30, 1999 and entitled, "APPARATUS FOR FUSING A SIDEWALL FITTING ONTO A PLASTIC PIPE".

It is not related to any international patent application.

REFERENCE TO MICROFICHE APPENDIX

This application is not referenced in any Microfiche Appendix.

BACKGROUND OF THE INVENTION

This invention relates to a method and an apparatus for fusing a plastic fitting to a plastic pipe. A typical means of attaching a thermoplastic component to a thermoplastic pipe is by heat fusion which means heating mating surfaces of a fitting and a portion of the exterior surface of a plastic pipe and while these surfaces are in molten states, joining the surface together under applied pressure and holding the pressure until the joined surface is cooled and are thereby fused to each other. Typically, the molten surfaces need to be held in juxtaposed positions for only a few seconds to cool to a solid state.

The basic concept of thermofusion of fittings to an exterior surface of a plastic pipe is well known. The method and apparatus herein are closely related to and constitute improvements on a sidewall applicator for heat fusion of a fitting to a plastic pipe as revealed in U.S. Pat. No. 5,505, 811, which issued on Apr. 9, 1996. For further background information relating to methods and apparatus for fusing fittings to plastic pipe reference should be had to the following patents as well as to references cited in U.S. Pat. No. 5, 505 811.

| U.S. Pat. No. | INVENTOR | TITLE |
| --- | --- | --- |
| 3,616,024 | Windle | Method and Apparatus for Welding Heat Sealable Pipes |
| 3,743,566 | Louthan et al. | Apparatus for Joining a Plastic Fitting to a Plastic Pipe |
| 3,820,773 | Aizawa | Apparatus for Feeding a Workpiece into Cutting Position on Cutting Device |
| 3,966,528 | Christie | Apparatus and Method for Joining a Branching Fitting to a Pipe |
| 4,092,205 | Mieszczak | Machine for Installing Tees |
| 4,338,712 | Dearman | Welding Fixture for Use in Joining Two Tubular Members |
| 4,445,677 | Hansen et al. | Clamping Apparatus for Plastic Pipe |
| 4,533,424 | McElroy | Pipe Fusion Apparatus with Load Cell for Attaching Side Wall Fittings |
| 4,542,892 | Goldner | Poly-Pipe Fusion Machine |
| 4,556,207 | Thompson et al. | Clamping Apparatus for Plastic Pipe |
| 4,894,521 | Evans | Electric Heating Element for Fusing Thermoplastic Materials |
| 4,957,570 | Jenkins et al. | Butt-Welding of Pipes |
| 5,505,811 | Welch et al. | Sidewall Applicator for Heat Fusion of a Fitting to a Plastic Pipe |

BRIEF SUMMARY OF THE INVENTION

This invention relates to an apparatus for fusing a plastic fitting to a plastic pipe.

The applicator of this invention includes spaced apart support shafts each having a lower end secured to the exterior of a plastic pipe so that the support shafts are in a common plane, normally a vertical plane, the plane including the axis of the plastic pipe. A housing is affixed on upper ends of the two support shafts. A vertical main shaft extends from the housing in the direction towards the pipe.

A transverse load cell is mechanically connected to the lower end of the main shaft and guided by the support shafts. A mechanically actuated brake is contained within the housing that releasable engages the main shaft, thus controlling the vertical position of the load cell.

The transverse load cell houses a hydraulically displaceable force shaft that telescopically extends downwardly from the load cell. A fitting holder is secured to the lower end of the force shaft. A hydraulic force generator in the load cell, operated by a hand wheel, provides hydraulic force to downwardly displace the force shaft so that a fitting, retained by the fitting holder, can be pressed against the exterior of the plastic pipe.

DESCRIPTION OF THE DRAWINGS

FIG. 1 is a elevational front view, shown partially in cross-section, of an apparatus for fusing a fitting onto a plastic pipe.

FIG. 2 is an elevational side view, shown partially in cross-section, of the apparatus of FIG. 1.

DETAILED DESCRIPTION OF A PREFERRED EMBODIMENT

FIG. 1 shows a first support shaft 10 and a spaced apart paralleled second support shaft 12, each of the support shafts have a lower end 14 that is attached to a fitting 16 by which the shafts may be supported to the exterior of a length of plastic pipe. Reference is specifically directed to FIGS. 1 and 2 of U.S. Pat. No. 5,505,811 that shows in detail one method by which the lower ends of opposed support shafts can be secured to a plastic pipe. Support shafts 10 and 12 are supported in a common plane, usually but not necessarily a vertical plane, the plane also encompassing the longitudinal axis of the length of plastic pipe to which the shafts are attached.

Secured at the upper ends of support shafts 10 and 12 is a lower housing 18. The left hand portion of lower housing 18 is shown in cross-section in FIG. 1 and shows a bolt 20 by which lower housing 18 is secured to the upper end of support shaft 10. A similar bolt (not seen) secures lower housing 18 to the upper end of support shaft 12.

Slidably received on support shafts 10 and 12, below lower housing 18 is a load cell 22. Specifically, load cell 22 has opposed openings 24 therein (only one opening being seen) that slidably receives support shafts 10 and 12.

Secured to the top end of lower housing 18 is an upper housing 26. Lower housing 18 has an opening 28 therethrough and in like manner, upper housing 26 has an opening 30 therethrough, openings 28 and 30 being in axial alignment and in a plane that includes support shafts 10 and 12. Opening 30 in upper housing 26 receives a linear bearing 32 and in like manner, opening 28 in lower housing 18 receives a liner bearing 34. Bearings 32 and 34 slidably receive a main shaft 36 that, on the lower end thereof as seen in FIG. 2, is attached to load cell 22.

Upper housing 26 is removably attached to lower housing 18 by means of bolts, one bolt 38 being seen in the left hand portion of the upper and lower housings as disclosed in the cross-sectional portion of FIG. 1.

The upper and lower housings provide therebetween a cavity 40 and within cavity 40 is an annular brake plate 42. Brake plate 42 has an opening 44 that receives main shaft 36. A spring 46 received on main shaft 36 urges brake plate 42 in an upward direction against a belville spring stack 47. As long as brake plate 42 is in a plane that is perpendicular to the longitudinal axis of main shaft 36, the main shaft may be manually raised and lowered thereby simultaneously raising or lowering load cell 22. A spring 46 is received on main shaft 36 urging brake plate 42 upwardly to keep it normally in a plane that is perpendicular to main shaft 36. However, if brake plate 42 is tilted out of a plane that is perpendicular to the axis of main shaft 36 then main shaft 36 is locked against movement.

Rotatably received in upper housing 26 is a brake shaft 48, the brake shaft extending partially within cavity 40. A handle 49 is attached to brake shaft 48. A pin 50 is received in and extends partially externally of brake shaft 48 so that when the brake shaft is rotated, by means of handle 49, pin 50 engages a surface of brake plate 42, tilting the brake plate with respect to the longitudinal axis of main shaft 36. When the brake plate is thus tilted, it is locked to the external surface of main shaft 36 preventing the main shaft from being displaced upwardly.

The internal configuration of load cell 22 as shown in a cross-sectional portion of FIG. 2 includes a cylindrical cavity 52 having a piston 54 therein. Cavity 52 communicates with a cylindrical cavity 56 within the load cell, cylindrical cavity 56 being in axial alignment with main shaft 36. Slidably positioned within cylindrical cavity 56 is a force piston 58 having a force shaft 60 extending downwardly from it.

Secured to a bottom surface 62 of load cell 22 is a fitting holder adapter 64. Openings are formed in the top portion of fitting holder adapter 64 that slide upon a plurality of bolts 66 (only one of which is seen in FIG. 62). The lower end of force shaft 60 contacts an upper surface of fitting holder adapter 64 so that when piston 58 and thereby force shaft 60 are forced downwardly, the fitting holder adapter 64 is forced downwardly, sliding on bolts 66.

Removably attached to fitting holder adapter 64 is a fitting holder 68 that is configured to removably receive a fitting (not shown), such as a plastic T-fitting to be secured to the external surface of a pipe wall. As an example of a fitting, specifically a T-fitting, secured by a fitting holder, reference can be had to FIG. 2 of U.S. Pat. No. 5,505,811.

Rotatably extending from load cell 22 is a hand wheel 70 that, when rotated, advances or retracts piston 54. A passageway 72 communicates horizontal cylinder cavity 52 with vertical cylinder cavity 56.

DESCRIPTION OF OPERATION

The apparatus for fusing a sidewall fitting onto a plastic pipe as illustrated in FIGS. 1 and 2 and as has been described, is operated by first attaching the lower ends 14 of first and second supports shafts 10 and 12 to the external surface of a pipe so that support shafts 10 and 12 extend parallel to each other and in a common plane of the pipe longitudinal axis. Load cell 22 is manually raised by moving it upwardly, sliding on support shafts 10 and 12 with main shaft 36 sliding upwardly through lower housing 18 and upper housing 26. A fitting, such as a plastic T-fitting, can then be secured to fitting holder 68.

Next, in the common practice, a heater element (not seen), such as seen in FIG. 2 of U.S. Pat. No. 5,505,811 is positioned between a fitting (not seen) supported by fitting holder 68 and the surface of a pipe (also not seen). Load cell 22 is then manually lowered so that the heating element engages the pipe exterior surface and simultaneously the surface of a fitting that is secured within fitting holder 68. After these surfaces have been heated to a molten state, load cell 22 is then manually raised slightly to allow removal of the heater and then the load cell is lowered so that the molten surface of the fitting is brought into contact with the molten surface of the pipe. When the fitting is in contact with the pipe, the operator then rotates brake shaft 48 by use of handle 49. This pivots or cocks brake plate 42 with respect to main shaft 36, prohibiting the main shaft from being upwardly displaced relative to housings 18 and 26. The operator then rotates hand wheel 70 to inwardly advance piston 54, causing hydraulic fluid to flow from cavity 52, through fluid passageway 72, into cylindrical cavity 56, thereby providing hydraulic force to downwardly displace piston 58. As piston 58 and thereby force shaft 60 are displaced, fitting holder adapter 64 and thereby fitting holder 68 are displaced outwardly, the fitting holder sliding on bolts 66. This downward force firmly engages the molten surface of the fitting with the molten surface of the pipe and maintains the fitting in secure contact with the pipe during the brief period required for the molten surfaces to cool to solidification, thereby securing the fitting to the pipe. The amount of force applied to urge the fitting into contact with the pipe external wall is determined by the hydraulic pressure applied against piston 58 which is controlled by the operator by rotation of hand wheel 70. The hydraulic pressure applied against piston 54 as hand wheel 70 is rotated to inwardly advance piston 54 is revealed in pressure gauge 74. Thereby the operator knows precisely the amount of force urging the fitting against the pipe external sidewall.

After a brief time the molten surfaces of the fitting and pipe will cool and solidify. The operator then can release the fitting from fitting holder 68. The operator can then rotate brake handle 49 and thereby shaft 48, releasing the force applied on brake plate 42. Brake plate 42, by action of spring 46 returns to a horizontal position. This action permits the operator to move load cell 22 upwardly since main shaft 36 can slide freely through opening 44 in the brake plate and though the openings in upper and lower housings 26 and 18.

Extending from upper housing 26 is a shaft lock 76 having a knob 78. This shaft lock can be used by the operator to retain main shaft 36 in a selected elevational position. For instance, when load cell 22 is manually elevated to permit a fitting to be secured to fitting holder 68 the operator can rotate the knob 78 so that main shaft 36 and load cell 22 remain in a fixed elevated position. The function of shaft lock 76 is for convenience, that is, it is not intended to be employed to secure main shaft 36 in position to apply force against a fitting. This action is provided by brake plate 42.

The apparatus for fusing a sidewall fitting onto a plastic pipe of this disclosure achieves the same results as the sidewall applicator as illustrated and described in U.S. Pat.

No. 5,505,811 but in a different way. In U.S. Pat. No. 5,505,811, an applicator housing is moved vertically on spaced apart support shafts and the applicator housing is locked to the support shafts by hydraulic action simultaneously with the hydraulic force employed to apply downward pressure on a fitting. Thus in the apparatus of U.S. Pat. No. 5,505,811 the operator does not have the benefit of selectably locking the load cell in a fixed position prior to the application of hydraulic pressure to downwardly displace the fitting holder. While the sidewall applicator of U.S. Pat. No. 5,505,811 functions satisfactorily nevertheless the apparatus for fusing a sidewall fitting of this invention has significant improvements and advantages.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of fusing a plastic fitting to a plastic pipe comprising the steps of:
   (a) affixing a fitting support apparatus to a pipeline, the fitting support apparatus having a transverse housing and a transverse load cell that carries said plastic fitting;
   (b) positioning said load cell with respect to said transverse housing to thereby position a fitting attached thereto relative to a plastic pipe;
   (c) locking said load cell in position with respect to said plastic pipe;
   (d) displacing said plastic fitting away from said load cell to force said plastic fitting against said plastic pipe.

2. A method of fusing a plastic fitting to a plastic pipe according to claim 1 wherein step (b) is mechanically accomplished and step (d) is hydraulically accomplished.

3. A method of fusing a plastic fitting to a plastic pipe according to claim 1 wherein step (b) is accomplished by changing the angular position of a brake plate supported by said transverse housing to a main shaft that positionably supports said transverse load cell.

4. A method of fusing a plastic fitting to a plastic pipe according to claim 1 wherein steps (c) and (d) are carried out substantially simultaneously.

5. Apparatus for fusing a plastic fitting onto a plastic pipe, that fitting having a contacting surface configured to engage a portion of an exterior surface of a plastic pipe, comprising:
   first and second spaced apart parallel support shaft, each having a lower end portion removably attachable to a plastic pie;
   a transverse housing secured to upper end portions of said support shafts and having an opening therethrough intermediate of and in a plane of said support shafts;
   a main shaft slidably receivable in said opening in said transverse housing;
   a brake supported by said transverse housing selectably limiting the longitudinal position of said main shaft;
   a transverse load cell having spaced apart openings slidably receiving said support shafts and being affixed to a lower end portion of said main shaft, the load cell being positionably on said support shafts by said main shaft;
   a hydraulically displaceable force shaft telescopically received in an opening in said load cell intermediate said support shafts having a fitting holder at a lower end thereof; and
   a hydraulic force generator in said load cell for selectably displacing said force shaft to force a fitting against a plastic pipe.

6. Apparatus for fusing a plastic fitting to a plastic pipe according to claim 5 wherein said hydraulic force generator comprises a piston in a cylinder in hydraulic fluid communication with said hydraulically displaceable force shaft.

7. Apparatus for fusing a plastic fitting to a plastic pipe according to claim 5 wherein said brake is in the form of a brake plate having an opening therein receiving said main shaft arranged to permit slidable movement of said main shaft when the brake plate is in one angular relation to said main shaft and to prohibit displacement when in a different angular relationship.

8. Apparatus for fusing a plastic fitting to a plastic pipe according to claim 7 including a brake shaft rotatably supported by said transverse housing adjacent to said having a protrusion capable of changing the angular relationship of said brake plate to said main shaft upon rotation of the brake shaft.

9. Apparatus for fusing a plastic fitting to a plastic pipe according to claim 6 wherein said piston is threadably advanced and retracted by rotation of a hand wheel.

* * * * *